US012683492B2

(12) United States Patent
Yu et al.

(10) Patent No.: US 12,683,492 B2
(45) Date of Patent: Jul. 14, 2026

(54) DYNAMIC NONLINEAR DROOP CONTROL

(71) Applicant: North Carolina State University, Raleigh, NC (US)

(72) Inventors: Hui Yu, Raleigh, NC (US); Srdjan Miodrag Lukic, Raleigh, NC (US); Hao Tu, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 421 days.

(21) Appl. No.: 18/514,660

(22) Filed: Nov. 20, 2023

(65) Prior Publication Data

US 2024/0171070 A1 May 23, 2024

Related U.S. Application Data

(60) Provisional application No. 63/426,571, filed on Nov. 18, 2022.

(51) Int. Cl.
| | |
|---|---|
| *H02M 3/156* | (2006.01) |
| *G05F 1/56* | (2006.01) |
| *H02J 1/00* | (2006.01) |
| *H02M 3/04* | (2006.01) |
| *H02M 3/155* | (2006.01) |

(52) U.S. Cl.
CPC .............. *H02M 3/155* (2013.01); *H02J 1/00* (2013.01)

(58) Field of Classification Search
CPC ........... H02M 3/155; H02M 3/156; H02J 1/00
USPC ....... 323/282, 284, 285, 222, 283, 311, 286, 323/266; 361/18; 363/16
See application file for complete search history.

(56) References Cited

U.S. PATENT DOCUMENTS 10,770,988 B2    9/2020   Chen et al.
2019/0207517 A1 *  7/2019   Karlsson ............... H02M 3/156

FOREIGN PATENT DOCUMENTS

WO    WO-2017178036 A1 * 10/2017 ............ H02M 3/156

OTHER PUBLICATIONS

Hui Yu, "Stability and Power Quality Issues in Networked Power Electronics Systems:Analyses and Solutions", NC State Theses and Dissertation., Dec. 23, 2021.
Chen, et al., "Investigation of nonlinear droop control in DC power distribution systems: load sharing, voltage regulation, efficiency, and stability", IEEE Transactions on Power Electronics, vol. 34, No. 10, Oct. 2019.

* cited by examiner

*Primary Examiner* — Elim Ortiz
(74) *Attorney, Agent, or Firm* — Thomas I Horstemeyer, LLP

(57) ABSTRACT

Various examples are provided related to dynamic nonlinear droop control (DNDC). In one embodiment, a method for DNDC for direct current (DC) power conversion includes receiving an indication of an output of a DC power converter, generating a control signal based upon the indication, and adjusting operation of the DC power converter in response to the generated control signal. The indication can be a scaled measurement of output current or output power of the DC power converter. The control signal is based at least in part upon the indication, the power converter voltage and DNDC parameters.

16 Claims, 10 Drawing Sheets

FIG. 3A          FIG. 3B

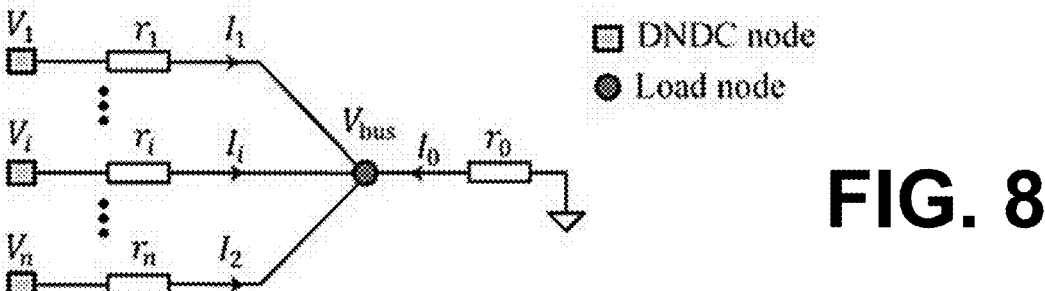
□ DNDC node
● Load node
FIG. 8
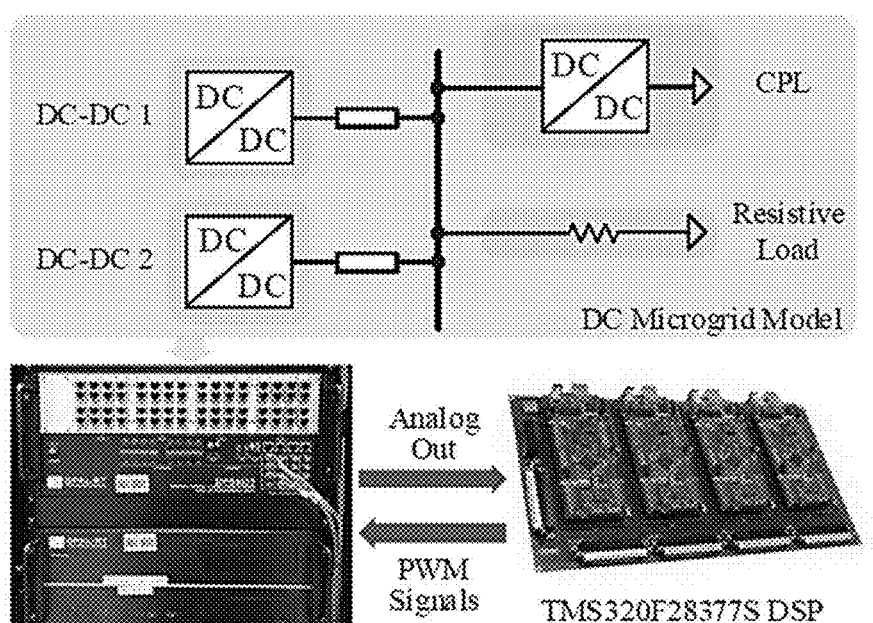
FIG. 9A
TABLE I: Converter and DNDC Parameters
| Parameter | | Value |
|---|---|---|
| Buck converter | $P_{o1}$, $V_o$, $f_{sw1}$ | 8 kW, 200 V, 10 kHz |
| | $L_{f1}$, $C_{f1}$ | 1 mH, 1 mF |
| DNDC | $\kappa_v$, $\kappa_i$ | 200, 1/40 |
| | $\mu$, $\eta$ | 15.27, 2.35 |
FIG. 9B

DYNAMIC NONLINEAR DROOP CONTROL

CROSS REFERENCE TO RELATED APPLICATIONS

This application claims priority to, and the benefit of, U.S. provisional application entitled "Dynamic Nonlinear Droop Control" having Ser. No. 63/426,571, filed Nov. 18, 2022, which is hereby incorporated by reference in its entirety.

BACKGROUND

DC microgrids are currently used extensively in aerospace and naval industries and are being considered for other applications as well. In DC microgrids, droop control is used to ensure power sharing between multiple sources. Droop control allows voltage deviation from its nominal value to enable decentralized power balance among different generators. In practical applications, the simple conventional droop control exhibits various issues in terms of power sharing accuracy, voltage regulation and stability especially when interfacing with constant power loads (CPLs) such as, e.g., a motor load. The negative incremental impedance of CPLs decreases the system damping and can easily destabilize the system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A and 3B illustrate characterizations of the nonlinear dynamics of $\dot{y}=\mu y(1-y^2)$, in accordance with various embodiments of the present disclosure.

FIG. 8 illustrates an example of an equivalent circuit for a DC microgrid under analysis, in accordance with various embodiments of the present disclosure.

FIGS. 9A and 9B illustrate an example of a C-HIL DC microgrid testbed for controller evaluation, in accordance with various embodiments of the present disclosure.

DETAILED DESCRIPTION

Figures 1, 2:
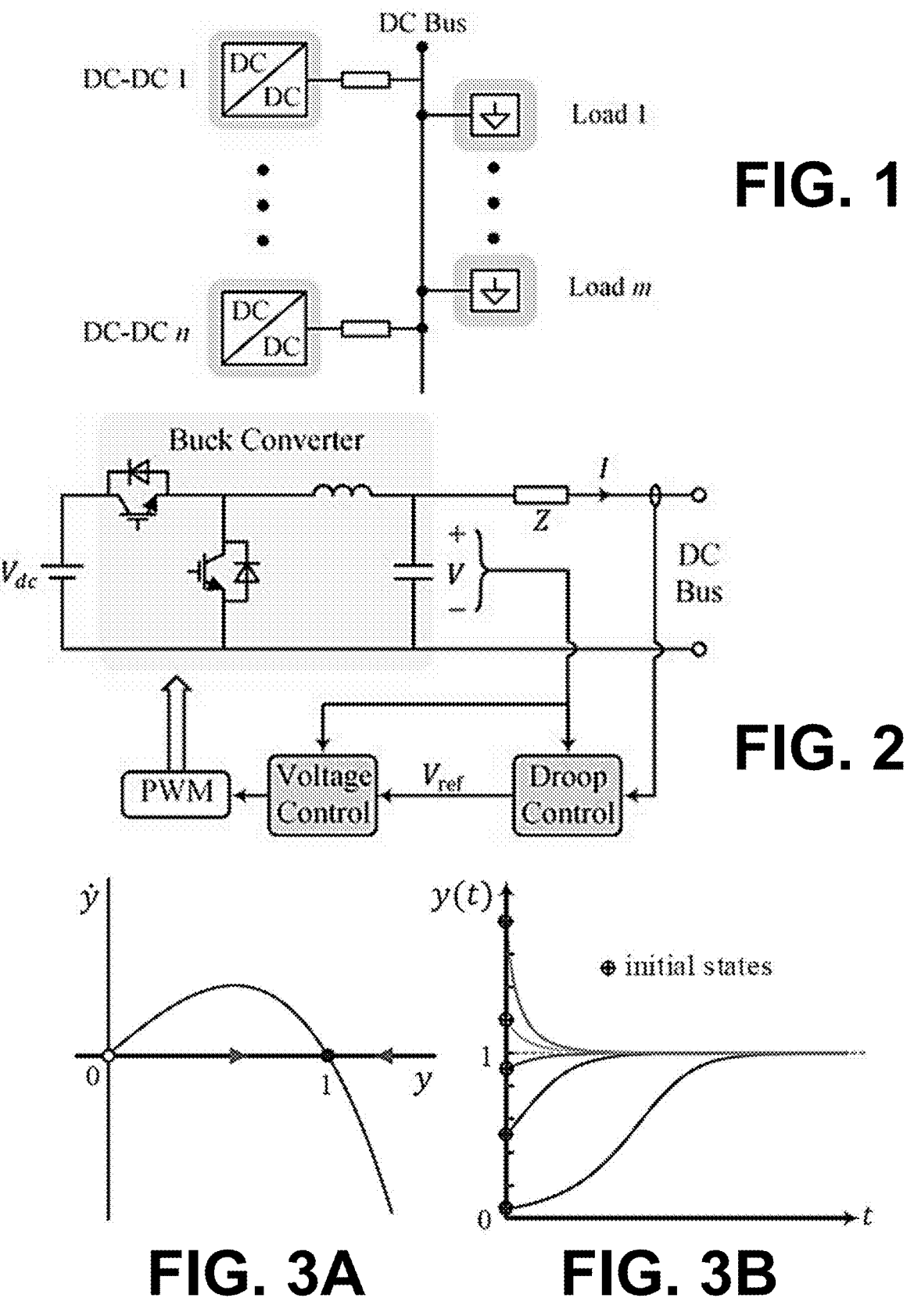
FIG. 1 illustrates an example of a single-bus DC microgrid, in accordance with various embodiments of the present disclosure.
FIG. 2 is a control diagram illustrating an example of a DC-DC converter with droop control, in accordance with various embodiments of the present disclosure.

Disclosed herein are various examples related to dynamic nonlinear droop control (DNDC). Reference will now be made in detail to the description of the embodiments as illustrated in the drawings, wherein like reference numbers indicate like parts throughout the several views.

A dynamic nonlinear droop control (DNDC) method is disclosed that improves power sharing among paralleled generators, while also improving the stability of DC microgrids. This idea is inspired by the virtual oscillator control (VOC) for AC microgrids. A first-order nonlinear system with a positive fixed stable point is introduced that can attract the system to this equilibrium point from almost any initial conditions (excepts for the origin) and control the DC-DC converters to mimic the dynamics of this nonlinear system. Higher-order nonlinear systems can also be utilized. DNDC uses a dynamic and nonlinear droop relationship in contrast to the conventional droop control that uses a static and linear droop expression. The disclosed DNDC can achieve global asymptotic voltage stability regardless of the number of parallel converters with resistive loads. In addition, it also improves the DC microgrids stability in presence of the CPLs.

The proposed DNDC introduces nonlinear dynamics, which provide an inertia-like response during transient events, and serves as virtual inertia for the DC microgrids. Virtual inertia that limits the rate of change of voltage (ROCOV), which is the DC equivalent of the rate of change of frequency (ROCOF) in AC systems, helps in the robust implementation of protection and secondary control. The amount of virtual inertia can be adjusted by tuning the DNDC parameters.

Furthermore, in steady state, DNDC shows a droop-like characteristics but with a load-dependent droop coefficient. At light load condition, a small droop coefficient is provided to ensure stringent voltage regulation, while at heavy load condition, a larger droop coefficient is provided to ensure accurate power sharing. It should be emphasized that at all load conditions, the voltage regulation is improved compared to conventional droop control. Last, but not least, the disclosed DNDC is much simpler than other exiting advanced control methods such as model predictive control (MPC) and backstepping control.

Any DC microgrid application can make use of DNDC. For example, this technology can be utilized in the aerospace and naval industries where DC distribution systems are already extensively used. The commercial problem for a plane designer is to ensure that all of their networked power sources share power proportionally while ensuring stable operation in the system. Currently there is no universally stable controller that will ensure such behavior. The disclosed method improves power sharing among paralleled generators, while also improving the stability of DC microgrids. The approach uses a dynamic and nonlinear droop relationship which can solve the issues noted above in an elegant and simple to implement manner. The DC micro-grids concepts may also be applied to other applications such as, e.g., DC homes, data centers, etc.

A microgrid is a group of interconnected loads and distributed generators (DGs) that can help achieve stable, efficient and economical operation of the future grid, especially in rural areas where the utility service is inaccessible or unreliable. DC power distribution is gaining attention due to high efficiency, direct interface to DC renewable energy resources and battery energy storage systems, and the compatibility with various types of DC loads such as consumer electronics, light-emitting diodes, etc. Another salient advantage of DC microgrids is that there is no reactive power flow and harmonics as in AC systems, which greatly simplifies the system design and management. Applications of DC microgrids have been proposed for powering clusters of electric vehicle chargers, integrated photovoltaic (PV) and energy storage systems, shipboard power systems, etc.

Hierarchical control architecture, frequently used for microgrids, defines three control levels: primary, secondary, and tertiary. Primary controllers are used to stabilize the microgrid voltage and realize power sharing without any communication. Droop control is the most widely used primary controller due to its simple structure and intuitive physical interpretation. In DC microgrids, droop control is used to linearly reduce each converter's terminal voltage according to its loading level. While droop control facilitates decentralized power sharing among different DGs without communication, its drawbacks are known. First, the converters' terminal voltage deviates from its nominal value, resulting in depressed voltage in the microgrid. Second, the power sharing performance depends on the line impedance between the converter and the DC bus. When line impedances are mismatched, the sharing is not proportional to the converter's rating.

The voltage deviation and power sharing performance of droop control can be improved by communication-based secondary control schemes. However, reliance on communication networks increases system cost and complexity. Many methods have been proposed to improve droop control's performance without using communication. A larger droop coefficient can improve the power sharing performance since it can dominate the droop relationship and reduce the impact from the line impedance. However, a larger droop coefficient can lead to larger voltage drop, which may not be acceptable under a heavy load condition. Hence, conventional droop control with a constant droop coefficient faces a design trade-off between voltage regulation stiffness and load sharing accuracy.

The droop coefficient can be interpreted as a virtual resistor in series with the line resistance. By designing the sum of virtual and line resistance the same for all the converters, the power sharing performance is improved. However, this method requires the knowledge of the line resistance for all the converters, which may not be available in practice. An adaptive droop control has been proposed which dynamically changes the droop coefficient according to the difference between the power rating and real-time loading of each converter. Converters with more spare capacity will have a larger droop gain and therefore deliver more power when the system load increases. Piecewise linear droop control strategies have also been proposed which divide the power capacity of the converter into several segments with different droop coefficients. The heavy-load segments are designed with larger droop coefficients than the segments at light-load. A nonlinear droop relationship with a generic polynomial expression has also been proposed which exhibits larger droop coefficients under heavy-load and smaller under light load.

Droop control is a linear equation without any internal state. Any change in the input (i.e., loading level) will be directly and proportionally reflected on the output (i.e., terminal voltage), which leads to rapid voltage fluctuation during load step events. Analogous to controlling the frequency fluctuation in AC systems, the concept of virtual inertia has been introduced in DC systems to limit voltage fluctuation. A first-order low pass filter can be inserted between power and voltage to provide virtual inertia in DC microgrids. Inertia in DC microgrids can be emulated by implementing the swing equations of a synchronous machine.

While droop control and its variations are widely used in both DC and AC microgrids, another family of emerging primary control methods, called virtual oscillator control (VOC), has been proposed specifically for AC microgrids. VOC controls the inverters to mimic nonlinear oscillator systems that have a stable limit cycle of a unit circle, thus achieving global voltage synchronization. Despite significant development of VOC for AC microgrids, the research on its DC counterpart is in its infancy. VOC in DC systems can use $\alpha\beta$–dq transformation to extract the d component of the AC VOC and use it as the reference value for the DC-DC converter's terminal voltage. On the measurement side, the output current is treated as d component, transformed into $\alpha\beta$ domain, and fed back to the AC VOC. With such an arrangement, the nonlinear VOC dynamics are still in AC domain, and the harmonics associated with the AC VOC can propagate to the DC voltage and current. In addition, the transformation between the AC VOC and DC variables causes additional nonidealities, which are not accounted for in the paper.

In this disclosure, a novel primary control method, called dynamic nonlinear droop control (DNDC), is proposed for DC systems to achieve voltage regulation and power sharing without any communication. The proposed DNDC can be seen as a DC counterpart of VOC for AC systems. Instead of using nonlinear oscillator systems with a stable limit cycle of an unit circle like AC VOC, we introduce a first-order nonlinear system with a fixed stable point that can attract the system to this equilibrium point from any initial condition except the origin, and we control the DC-DC converters to mimic the dynamics of this nonlinear system. Unlike [28] that uses the AC VOC dynamics and transforms the AC variables into DC, the nonlinear dynamics of DNDC are DC variables without any harmonics.

The proposed DNDC introduces nonlinear dynamics into the primary control, in contrast to static and proportional droop control. A design guideline is presented to control the nonlinear dynamics and it is also demonstrated that the nonlinear dynamics provide inertia-like response as in other methods. Virtual inertia that limits the rate of change of voltage (ROCOV), which is the DC equivalent of the rate of change of frequency (ROCOF) in AC systems, helps in the robust implementation of protection and secondary control. In this context, it is worth mentioning that DNDC is compatible with the state-of-the-art communication-based secondary control schemes.

In steady state, DNDC demonstrates a load-dependent nonlinear droop behavior in contrast to the linear behavior of conventional droop control. DNDC has a small droop coefficient under light load to ensure stringent voltage regulation; under heavy load condition, DNDC has a large droop coefficient to improve power sharing performance. Over all load conditions, the voltage regulation can be improved compared to conventional droop control. Compared to other methods, the DNDC method has a closed-form formula of the nonlinear dynamics, and thus provides opportunities for rigorous theoretical analysis. To that end, equilibria and stability analysis are provided for systems with DNDC converters. It can be shown that there exists a unique non-trivial equilibrium that guarantees voltage synchronization and proportional power sharing among the converters.

The basic idea of the DNDC will now be introduced and a detailed DNDC parameter design guideline provided. Then, the virtual inertia and nonlinear droop behavior of the DNDC are analyzed. Next, the equilibria and stability analysis of DC microgrids is performed with multiple converters under DNDC and experimental results shown.

Problem Statement and DNDC

Referring to FIG. 1, shown is a single-bus DC microgrid with multiple parallel DGs and loads. The DGs under study refer to the dispatchable DGs and they are connected to the DC bus by DC-DC converters to support the bus voltage. FIG. 2 shows a buck converter and its associated control as an example of the DC-DC converters. The inner voltage loop (or current and voltage dual loops) regulates the converter's output voltage V to its reference value $V_{ref}$, which is generated by a primary controller. One common primary controller for DC microgrids is the V-P droop control, given as:

$$V_{ref} = V_o - K_p P, \tag{1}$$

where $K_p$ is the droop coefficient, $V_o$ is the nominal voltage of the microgrid, and P=VI is the converter's output power. The conventional droop controller is a linear and static equation without internal dynamics. The voltage deviates from the nominal voltage $V_o$ when the output power is not zero, and the voltage deviation is proportional to $K_p$. A large $K_p$ leads to a large voltage deviation but improves power sharing among the converters; a small $K_p$ results in a small voltage deviation but gives poor power sharing.

A novel primary controller, DNDC, is proposed to replace the droop control block in FIG. 2. Since the dynamics of PWM and inner current/voltage loops are much faster than primary controllers, in the rest of the paper, the converter output voltage is assumed to be accurately regulated to the reference voltage by the inner loops, i.e., $V=V_{ref}$, for theoretical analysis.

Proposed DNDC. The mathematical model that underlies DNDC can be described by the following dynamic nonlinear equation:

$$\dot{y} = \mu y(1 - y^2), \tag{2}$$

where y is the state variable and μ>0 is a parameter to be designed. Equation (2) is a first-order nonlinear autonomous system. The most distinct characteristic of this system is its capability to stabilize to the steady state y=1 from any initial state except the origin. In FIG. 3A, the phase portrait of the system suggests that starting from any initial value of y, the system will finally flow to and be stabilized at y=1, which is the only stable fixed point of the system. FIG. 3B shows the time domain response of y(t) with different initial values. All trajectories of the time domain response asymptote to the horizontal line y=1 from the initial states or conditions. The parameter μ determines the convergence speed but does not change the steady state y=1.

It worth noting that y=−1 is another fix point of equation (2). When the initial value is negative, the system will settle at y=−1. However, as will be shown later, y is the converter's voltage in the proposed DNDC. Because the voltage in DC microgrids is always positive, it intrinsically prohibits the fix point y=−1.

Figure 4:
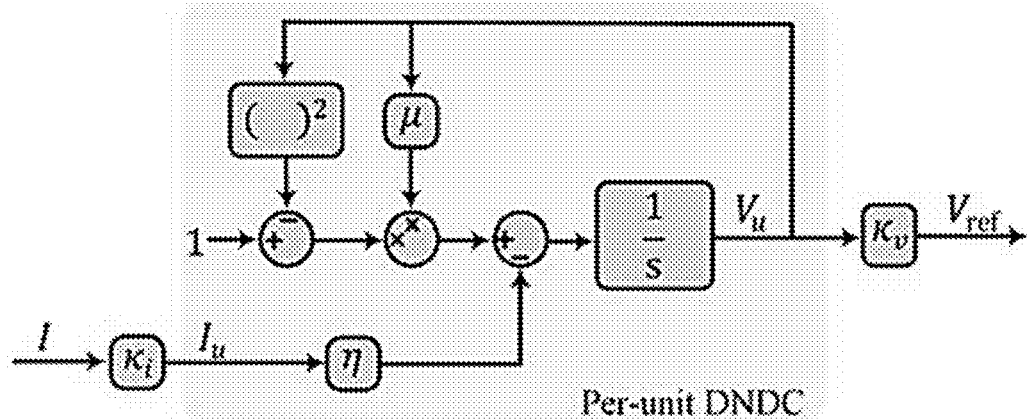
FIG. 4 is a control diagram illustrating an example of a dynamic nonlinear droop control (DNDC), in accordance with various embodiments of the present disclosure.

Adding an input to equation (2) yields:

$$\dot{y} = \mu y(1 - y^2) - \eta x, \tag{3}$$

where x is the input, and n is another parameter to be designed. Equation (38) is a generalization of this equation. Based on equation (3), the following DNDC control law is proposed:

$$\dot{V} = \frac{\mu}{\kappa_V^2} V(V_o^2 - V^2) - \eta \kappa_V \kappa_I I, \tag{4}$$

where $\kappa_V$ and $\kappa_I$ are voltage and current scaling coefficients, respectively, selected as:

$$\kappa_V = V_o, \kappa_I = V_o / P_o, \tag{5}$$

where $P_o$ is the nominal power of the converter. If the base voltage and power are selected as $V_b = V_o$ and $P_b = P_o$, respectively, the proposed DNDC control law of equation (4) can be given as per-unit variables as:

$$\dot{V}_u = \mu V_u(1 - V_u^2) - \eta I_u, \tag{6}$$

where $V_u$, $I_u$, and $P_u$ are the per-unit voltage, current, power, respectively. The per-unit form of DNDC given by equation (6) is the same as the nonlinear equation (3), and it is the sum of two terms. The first term tries to regulate the per unit voltage to unity by the nonlinear dynamics of equation (2), and the second term facilitates power sharing by a negative current feedback. The detailed control block diagram of DNDC is shown in FIG. 4.

Parameters Design and Nonlinear Droop Behavior of DNDC

In this section, a design guideline for the DNDC parameters μ and η is presented. The virtual inertia and steady-state nonlinear droop behavior of the DNDC are then analyzed, highlighting its advantages over conventional droop control.

DNDC Parameters Design. Rise time and μ: The parameter μ mainly influences the convergence speed of the nonlinear system, which determines how fast the voltage can be built up by the converter. Consider the unloaded condition, i.e., $P_u = 0$, and equation (6) can be rewritten as:

$$\dot{V}_u = \mu V_u(1 - V_u^2). \tag{7}$$

7

Multiplying both sides of equation (7) by $V_u$ gives:

$$V_u \dot{V}_u = \frac{1}{2} \frac{dV_u^2}{dt} = \mu V_u^2 (1 - V_u^2). \tag{8}$$

Treating $$V_u^2$$

as a variable, equation (8) can be seen as a Bernoulli differential equation. Assuming that the initial value of $V_u$ is $V_u(0)$, the differential equation can be solved as:

$$V_u^2(t) = \frac{1}{1 + C_1 e^{-2\mu t}} \Rightarrow V_u(t) = \sqrt{\frac{1}{1 + C_2 e^{-2\mu t}}}, \tag{9}$$

where $C_1$ is an initial value dependent constant:

$$C_1 = \frac{1 - V_u^2(0)}{V_u^2(0)}. \tag{10}$$

Rise time can be used as a measurement of the convergence rate of the nonlinear system, which is usually defined as the time for the waveform to go from 10% to 90% of its final value. Let $V_u(0)=0.1$, $V_u(t)=0.9$ and solve for t in equation (9), the rise time $T_r$ can be obtained as:

$$T_r = \frac{3.02}{\mu} \Rightarrow \mu = \frac{3.02}{T_r}. \tag{11}$$

This shows that the parameter $\mu$ can be designed based on the desired rise time $T_r$.

Steady-state voltage deviation and $\eta$: Consider the steady-state characteristics of DNDC. By letting $\dot{V}_u=0$, the steady state can be obtained as:

$$0 = \mu V_u (1 - V_u^2) - \frac{\eta P_u}{V_u}. \tag{12}$$

Treating $$V_u^2$$

as an unknown variable, equation (12) is a quadratic equation about the unknown. Hence, $V_u$ can be solved as:

$$V_u = \sqrt{\frac{1}{2} + \sqrt{\frac{1}{4} - \frac{\eta}{\mu} P_u}}. \tag{13}$$

It can be seen from equation (13) that when the system is unloaded, i.e., $P_u=0$, $V_u=1$; when it is operating at full rated power, i.e., $P_u=1$, the voltage will be the lowest. The per-unit

8 maximum voltage deviation $\Delta V_{umax}$ can be obtained at $P_u=1$ as:

$$\Delta V_{umax} = 1 - \sqrt{\frac{1}{2} + \sqrt{\frac{1}{4} - \frac{\eta}{\mu}}}. \tag{14}$$

Solving for $\eta$ gives:

$$\eta = \mu \Delta V_{umax} (2 - \Delta V_{umax})(1 - \Delta V_{umax})^2. \tag{15}$$

This shows that the parameter $\eta$ can be designed based on the allowable voltage deviation $\Delta V_{umax}$ at full power.

If the allowable voltage deviation is 10% at full power, substituting $\Delta V_{umax}=0.1$ into equation (15) gives:

$$\eta = 0.154 \mu. \tag{16}$$

In this disclosure, for illustration purpose, equation (16) will be used for the DNDC design. In practical microgrids, the line resistance between the converter and the DC bus leads to extra voltage drop. Therefore, some margin is needed when the designing $\eta$ in practical implementations.

Virtual Inertia of DNDC. While equation (11) relates $\mu$ to the voltage rise time during start-up, another way to understand $\mu$ is as virtual inertia. The inertia in DC microgrids can be defined as the ability to prevent sudden voltage changes. Under this definition, $\mu$ that determines the transition from one steady-state voltage to another during load change can be used to dynamically parameterize the virtual inertia of DNDC.

Figure 5:
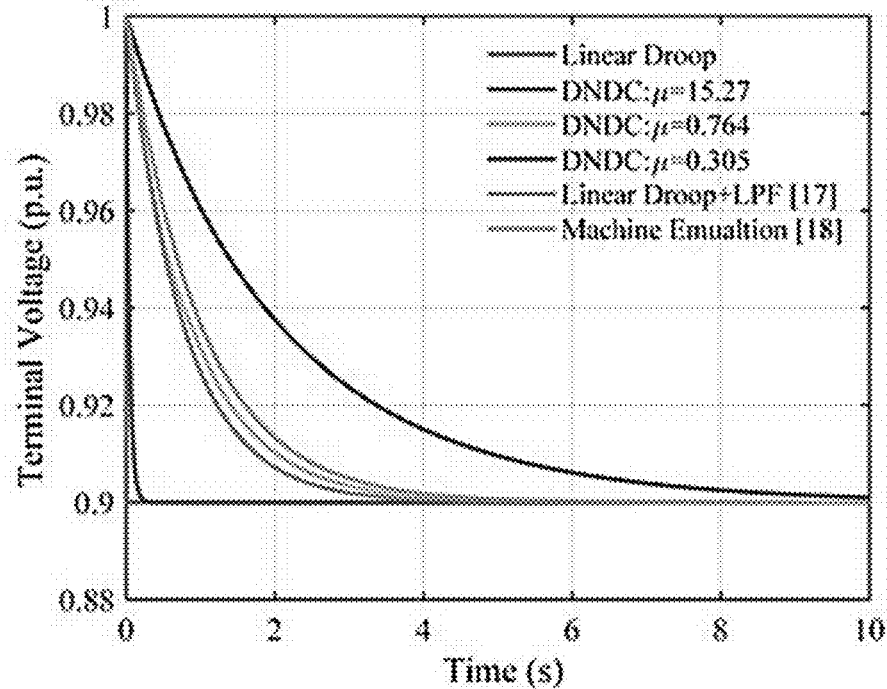
FIG. 5 illustrates examples of terminal voltage trajectories, in accordance with various embodiments of the present disclosure.

FIG. 5 shows that terminal voltage trajectory when the converter output power is stepped from zero load to full load for different control methods. Droop control without any internal dynamics steps from 1 to 0.9 p.u. instantaneously while DNDC shows first-order-like response depending on its parameter $\mu$. For large $\mu$, DNDC has a fast response close to droop control. For small $\mu$, DNDC approaches the new steady state voltage gradually. For comparison, the terminal voltage trajectory for other control methods which provide the virtual inertia by inserting a low pass filter and by emulating a synchronous machine, respectively, are also shown. When properly designed, DNDC and the other methods have similar inertia-like response.

Figure 6:
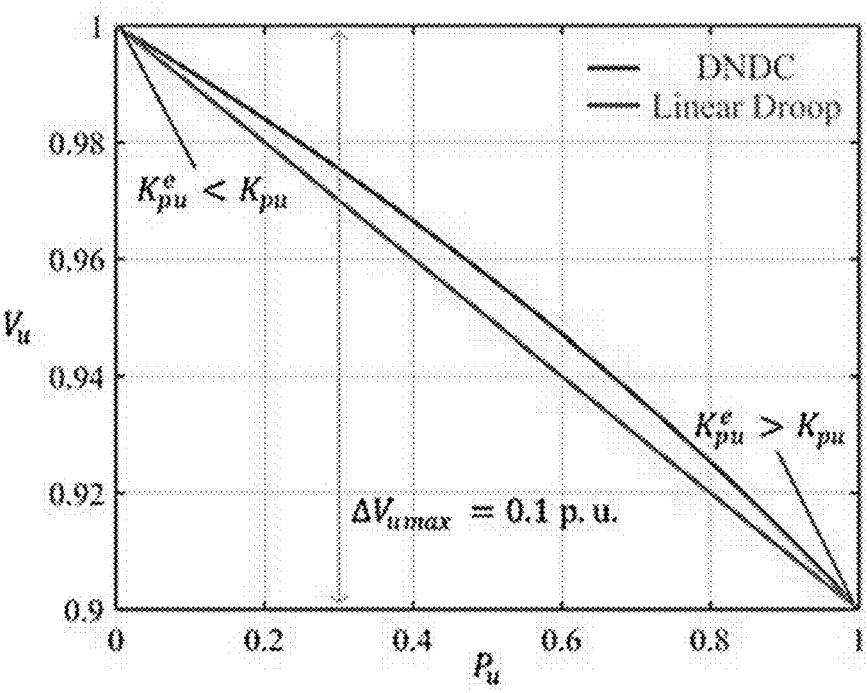
FIG. 6 illustrates examples of steady-state voltage of DNDC and linter droop control as a function of power output, in accordance with various embodiments of the present disclosure.

Nonlinear Droop Behavior of DNDC. According to equation (13), DNDC exhibits a droop-like behavior in steady state, i.e., the voltage drops with the power, but it is nonlinear. FIG. 6 shows the converter voltage as a function of its power output for DNDC according to equation (13) and for the conventional linear droop control according to equation (1). To make them comparable, the control parameters were designed such that both of them exhibit 0.1 p.u. voltage drop when the converter reaches its full power.

In contrast to the linear droop control that has a constant (per-unit) droop coefficient $K_{pu}$, DNDC in steady state exhibits different equivalent droop coefficients under different load conditions. Next, the equivalent droop coefficient $$K_{pu}^e$$

of DNDC can be derived for a steady-state voltage $V_{ue}$ and power $$P_{ue}^e.$$

Equation (12) can be linearized by perturbing it with a small-signal value of $\Delta V_u$ and $\Delta P_u$ around the operating point:

$$\mu(V_{ue} + \Delta V_u)^2 \left(1 - (V_{ue} + \Delta V_u)^2\right) = \eta(P_{ue} + \Delta P_u). \tag{17}$$

Expanding equation (17) and neglecting the higher order terms of $\Delta V_u$ and $\Delta P_u$ yields:

$$\frac{\Delta V_u}{\Delta P_u} = -\frac{\eta}{2\mu V_{ue}(2V_{ue}^2 - 1)}. \tag{18}$$

The equivalent per-unit droop coefficient for DNDC at the operating point $V_{ue}$ is:

$$K_{pu}^e = \frac{\eta}{2\mu V_{ye}(2V_{ue}^2 - 1)}. \tag{19}$$

The equivalent droop coefficient $$K_{pu}^e$$

is related to not only the DNDC parameters $\mu$ and $\eta$, but also the steady-state operating voltage $V_{ue}$. If the largest allowable voltage is no less than 90% of its rated value, i.e., $V_{ue} \geq 0.9$ and thus $$2V_{ue}^2 > 1.$$

Figure 7:
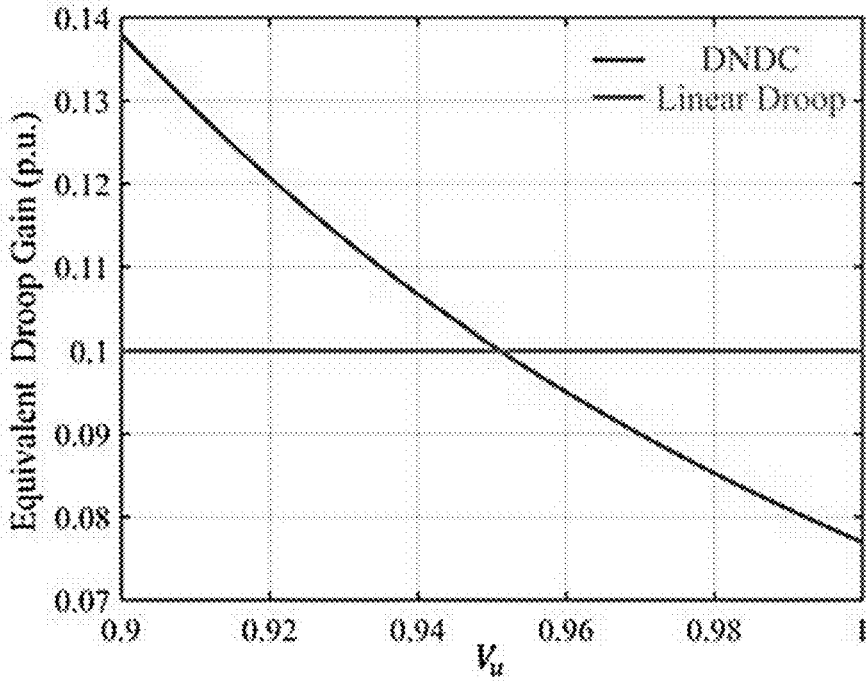
FIG. 7 illustrates an example of equivalent droop coefficient as a function of steady-state voltage, in accordance with various embodiments of the present disclosure.

In this range, $$K_{pu}^e$$

is a monotonically decreasing function of $V_{ue}$ as shown in FIG. 7. This behavior of $$K_{pu}^e$$

gives one major advantage of DNDC over linear droop control as explained below.

Over all load conditions, DNDC provides tighter voltage regulation than the conventional linear droop. In FIG. 6, the DNDC curve is always above the linear droop curve, which means a smaller voltage deviation for a given power output. Under heavy load conditions when the steady-state voltage $V_{ue}$ is reduced below 0.95 p.u., DNDC shows a larger equivalent droop coefficient $$K_{pu}^e$$

than linear droop as shown in FIG. 7. The large equivalent droop coefficient $$K_{pu}^e$$

can reduce the impact from the line impedance mismatch and improve the power sharing performance. This is especially desirable under heavy load conditions because disproportional power sharing can lead to overloading of some converters when the microgrid load is close to the limit.

Equilibria and Stability Analysis for DC Microgrids with Converters Controlled by DNDC While a design guideline for DNDC parameters based on the performance of a single converter has been provided, the equilibria and stability analysis of DC microgrids with n converters under DNDC is now performed. First it is shown that, under some common assumptions, a unique nontrivial equilibrium that guarantees the voltage synchronization and proportional power sharing of the converters exists. Then, the local stability of the equilibrium is proven by evaluating the Jacobian matrix at the non-trivial equilibrium point.

Notation. Let $\mathbb{R}$ and $\mathbb{R}_{>0}$ be the sets of real numbers and strictly positive real numbers, respectively. For a vector $x \in \mathbb{R}_n$, $[x]$ is the associated diagonal matrix with the elements of $x$ on the diagonal. Use $1_n$ to denote the n-dimensional vectors with all one elements and use $0_{n \times m}$ to denote a matrix with all zeros of size $n \times m$. The $n \times n$ identity matrix is $I_n$. A subscript $i$ can be used to mean the variable is for the ith converter unless the variable is the same for all converters.

Microgrid Model. Consider a microgrid with n DC-DC converters under DNDC. The DC-DC converters can be connected to the DC bus through different line impedance $Z_i$. Assume that the line impedance is purely resistive, i.e., $Z_i = r_i$, which is a common assumption for analyzing DC microgrids. Further assume that $r_i$ is reversely proportional to the converter's rating, i.e.:

$$P_{o,1}r_1 = P_{o,2}r_r = \ldots = P_{o,n}r_n = W, \tag{20}$$

Equation (20) is a common assumption to facilitate theoretical analysis. For example, the same assumption has been made when analyzing the synchronization of VOC. More discussion about line impedance assumption can be found in remark 1.

The loads are modelled by constant impedance and combined into a single equivalent resistor $r_0$. For such a system, an equivalent circuit diagram is shown in FIG. 8. The system dynamics are described by the following nonlinear equations:

$$\dot{V}_i = \frac{\mu}{\kappa_V^2} V_i(V_o^2 - V_i^2) - \eta \kappa_V \kappa_{I,i} I_i, \tag{21a}$$

-continued $$I_0 = -\sum_{p=1}^{n} I_p = -g_0 V_{bus} \tag{21b}$$

$$I_i = g_i(V_i - V_{bus}) \tag{21c}$$

where $g_i=1/r_i$ is the line conductance and $g_0=1/r_0$ is the load conductance. They can be written in matrix form as:

$$\dot{V} = \frac{\mu}{\kappa_V^2}(V_o^2 I_n - [V][V])V - \eta\kappa_V K_I I, \tag{22a}$$

$$I - GV, \tag{22b}$$

where $V=[V_1 \; V_2 \ldots V_n]^T$ and $I=[I_1 \; I_2 \ldots I_n]^T$ are the vectors for converters' voltage and current, respectively; $K_I$ is a diagonal matrix of control gains $\kappa_{I,i}$; and $G$ is the equivalent conductance matrix that connects converters' voltage and current vectors, which can be obtained via Kron reduction of the microgrid circuit in FIG. 8.

Existence and Uniqueness of the Non-trivial Equilibrium. The equilibria of system (22) can be found by setting the derivatives to zero and substituting equation (22b) into equation (22a), the voltage vector at the equilibria must satisfy:

$$\eta\kappa_V K_I GV = \frac{\mu}{\kappa_V^2}(V_o^2 I_n - [V][V])V. \tag{23}$$

It is easy to observe that $V=0_n$ is a trivial equilibrium, which is of no interest. In the following, the existence of a non-trivial equilibrium with voltage vector $$V = V_{eq} \in R_{>0}^n$$

is first shown. Then, it is shown that this is the only non-trivial equilibrium in the allowable voltage range, i.e., it is unique.

Existence: let the voltage vector at the non-trivial equilibrium have the form of $V_{eq}=V_{eq}1_n$. Substituting it into equation (23) and rearranging the terms gives:

$$K_I = G1_n = \frac{\mu}{\eta\kappa_V^3}(V_o^2 - V_{eq}^2)1_n. \tag{24}$$

This shows that if $1_n$ is the eigenvector of $K_I G$, and the corresponding eigenvalue is $\lambda_{KG}$, the voltage vector at the non-trivial equilibrium can be calculated by:

$$V_{eq} = \left(\sqrt{V_o^2 - \frac{\eta\kappa_V^3}{\mu}\lambda_{KG}}\right)1_n \tag{25}$$

It can be shows that under the assumption of equation (20) $K_I G$ always has an eigenvector $1_n$, and the corresponding eigenvalue is:

$$\lambda_{KG} = \frac{V_o}{\sum_{p=1}^{n} P_{o,p}} \frac{g_0 \sum_{p=1}^{n} g_p}{\sum_{p=1}^{n} g_p + g_0} > 0. \tag{26}$$

Therefore, $$V_{eq} \in R_{>0}^n$$

exists if the term under square root in equation (25) is positive, which gives:

$$\sum_{p=1}^{n} P_{o,p} > \frac{\eta V_o^2}{\mu} \frac{g_0 \sum_{p=1}^{n} g_p}{\left(\sum_{p=1}^{n} g_p + g_0\right)}, \tag{27}$$

If the DNDC parameters are designed based on equation (16), the condition of equation (27) always holds for practical microgrids (see remark 2). More discussion about equations (25), (26) and (27) for practical microgrids can be found in remark 2.

The current vector at the non-trivial equilibrium can be calculated by equation (22b). Substituting equations (23) and (25) into equation (22b) gives:

$$I_{eq} = K_I^{-1}\left(\lambda_{KG}\sqrt{V_o^2 - \frac{\eta\kappa_V^3}{\mu}\lambda_{KG}}\right)1_n. \tag{28}$$

Recalling that the current scaling coefficient $\kappa_{I,i}$ defined in equation (5) is reversely proportional to the converter i's power rating, the current sharing at the non-trivial equilibrium given by equation (28) is proportional to the converter's power rating.

Uniqueness: To show that the non-trivial equilibrium given by equations (25) and (28) is unique, assume that there exist another non-trivial equilibrium whose voltage vector has two unequal components $V_i \neq V_j$ and derive contradictions. Without loss of generality, assume $V_j - V_i = \Delta V > 0$. The i-th row and j-th row of equation (23) are:

$$\frac{\eta\kappa_V^3}{\mu}\kappa_{I,i}\sum_{p=1,\ldots,n} G_{ip}V_p = (V_o^2 - V_i^2)V_i, \tag{29a}$$

$$\frac{\eta\kappa_V^3}{\mu}\kappa_{I,j}\sum_{p=1,\ldots,n} G_{jp}V_p = (V_o^2 - V_j^2)V_j. \tag{29b}$$

Subtracting equation (29b) from equation (29a) gives:

$$\frac{\eta\kappa_V^3}{\mu}D\Delta V = (V_o^2 - V_i^2)V_i - (V_o^2 - V_j^2)V_j. \tag{30}$$

where $D<0$.

For a practical load condition when the DNDC parameters are designed based on equation (16), the voltage drop is less than 10% and the converter voltage satisfies $V_j > V_i \geq V_o/\sqrt{3}$. In this region, function $$f(x) = \left(V_o^2 - x^2\right)x$$

is monotonically decreasing, and the right side of equation (30) is positive. This contradicts the fact that left side of equation (30) is negative and the assumption $V_j - V_i = \Delta V > 0$. This completes the proof that there does not exist a non-trivial equilibrium whose voltage vector has two unequal components in the allowable voltage range. The non-trivial equilibrium given by equations (25) and (28) is unique.

Stability of the Non-trivial Equilibrium. In the following, it is shown that the non-trivial equilibrium is locally exponentially stable by evaluating the Jacobian matrix at the equilibrium. The Jacobian matrix of equation (22a) at the nontrivial equilibrium is:

$$J = wI_n - \eta\kappa_V K_I G \qquad (31)$$

where $$W = \frac{\mu}{\kappa_V^2}\left(V_o^2 - 3V_{eq}^2\right).$$

The non-trivial equilibrium is locally exponentially stable if the Jacobian matrix of equation (31) is Hurwitz. The eigenvalues of equation (31) can be found by:

$$\lambda(J) = \eta\kappa_V\lambda(-K_I G) + w. \qquad (32)$$

It can be shown that $-K_I G$ is a Hurwitz, i.e., all eigenvalues of $-K_I G$ have negative real parts. Because the voltage at the non-trivial equilibrium $V_{eq}$ should have less than 10% voltage drop when the DNDC parameters are correctly designed (see remark 2), $$w = \frac{\mu}{\kappa_V^2}\left(V_o^2 - 3V_{eq}^2\right) < 0.$$

Therefore, all eigenvalues of J have negative real parts, and the non-trivial equilibrium is locally exponentially stable.

Remark 1: (Impedance Matching Assumption) The stable non-trivial equilibrium given by equations (25) and (28) suggests that the converter voltage converges to $V_{eq}$, and the current (and power) is proportional to the converter's rating under assumption of equation (20); if equation (20) is not satisfied, the current sharing will not be ideally proportional due to the unequal voltage drop on the line impedance. The conventional droop control demonstrates the same behavior. A major advantage of DNDC over conventional droop control is that it achieves better power sharing at heavy load condition when equation (20) is not satisfied, and tighter voltage regulation over all load condition (regardless of whether equation (20) is satisfied or not).

Remark 2: (Eigenvalue $\lambda_{KG}$, Condition of Equation (27), and Equilibrium Voltage $V_{eq}$ for Practical Microgrids) For practical microgrids, the line conductance is much larger than the load conductance, i.e.:

$$g_i \gg g_0 \text{ for } i = (1, 2, \dots, n). \qquad (33)$$

Thus, equation (26) can be approximated by:

$$\lambda_{KG} \approx \frac{V_o}{\sum_{p=1}^{n} P_{o,p}} g_0, \qquad (34)$$

which shows the eigenvalue $\lambda_{KG}$ can be seen as an indicator for the load condition of the microgrid. Heavier load (larger $g_0$) leads to larger $\lambda_{KG}$, and vice versa.

With equation (33), the condition of equation (27) can be approximated by:

$$\sum_{p=1}^{n} P_{o,p} > \frac{\eta V_o^2}{\mu} g_0 \approx 0.154 V_o^2 g_0 = 0.154 P_{load}(V_o), \qquad (35)$$

Where equation (16) is used, and $P_{load}(V_o)$ is the load power at nominal voltage $V_o$. The left side of equation (35) is the total capacity from all converters. For a practical operating condition, the total capacity should at least satisfy the load at 0.9 p.u. voltage (after considering the voltage drop due to droop behavior):

$$\sum_{p=1}^{n} P_{o,p} \geq P_{load}(0.9V_o) = 0.81 P_{load}(V_o), \qquad (36)$$

which can be achieved by load shedding if the load exceeds the limit. Therefore, equations (35) and (27) are always satisfied for practical microgrids.

Submitting equations (34), (35), and (36) into equation (25) gives:

$$V_{eq} = V_o\left(\sqrt{1 - 0.154\frac{P_{load}(V_o)}{\sum_{p=1}^{n} P_{o,p}}}\right) \geq 0.9V_o. \qquad (37)$$

It shows the design method of equation (16) for a single converter gives the designed equilibrium voltage for a n-converter microgrid.

Experimental Validation

In this section, a HIL testbed is introduced for implementing and testing the DNDC. The testing results for various cases are presented to validate the performance of DNDC under different conditions.

FIG. 9A shows the HIL testbed based on an OPAL-RT real-time simulator and industry-grade control hardware. FPGA-based simulator with a simulation time step of 250 ns is used to simulate the microgrid components including the switching models of the converters. Digital signal processors (DSPs) TMS320F28377S from Texas Instruments are used to control the converters. Measurement signals like voltages and currents are sent to the DSP via analog out modules on OPAL-RT simulator, and the PWM signals are generated and sent to the simulator as gate signals for the DC-DC converters.

FIG. 9A shows the DC microgrid under consideration. Two identical buck converters were controlled by the DSPs to energize the 200 V DC bus. In the DSP, current and voltage dual-loop control with load current feed-forward is implemented to regulate the converter's output voltage; and DNDC was implemented to serve as its primary controller. The converter and DNDC parameters are given in Table I of FIG. 9B. According to the design method, the DNDC parameters give a rise time $T_r$=3.02/$\mu$=200 ms and a voltage drop 0.1 p.u. at full load (excluding the voltage drop on the line impedance).

To show that DNDC can work with different types of loads, the test microgrid includes one resistive load and one constant power load (CPL). The resistive load is 5$\Omega$ which gives 8 kW at the nominal voltage. The CPL is regulated by a point-of-load (POL) buck converter, which is also controlled to deliver 8 kW by one DSP in the testbed.

Voltage Synchronization and Power Sharing under Equal Line Impedance. In this case, the two buck converters controlled by DNDC are connected to the DC bus through equal line impedance, i.e., $r_1$=$r_2$=0.1$\Omega$. Since the two converters have the same power rating, the assumption of equation (20) is satisfied. The test results are shown in FIGS. 10, 11, and 12.

Figure 10:
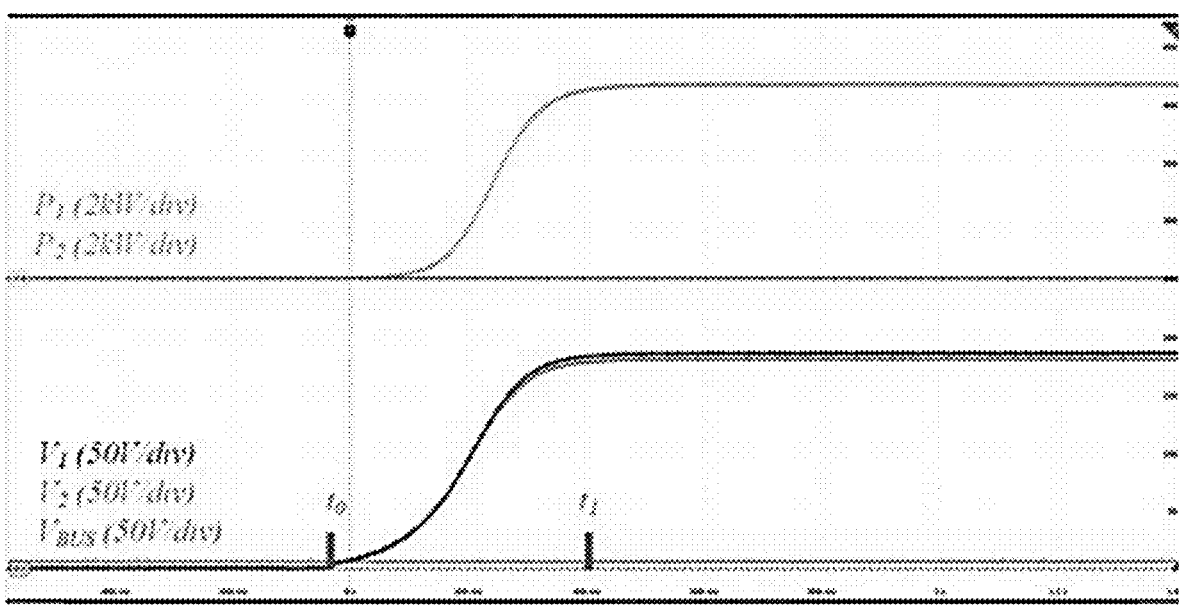
FIGS. 10-15B illustrate examples of experimental validation results of the DNDC, in accordance with various embodiments of the present disclosure.

FIG. 10 shows the start-up process of converter 1. Initially, converter 1 and the resistive load are connected to the dc bus; converter 2 and the CPL are not connected. Converter 1 is enabled at $t_0$, and voltage is built up gradually. At $t_1$, the voltage reaches steady state $V_1$=184.6 V. The rise time (10% to 90% steady state voltage) is about 200 ms, which validates the design method for $\mu$. In steady state, the converter's power output is $P_1$=6.68 kW. and the DC bus voltage is $V_{bus}$=181.0 V, which is lower than $V_1$ due to the voltage drop on the line impedance.

Figure 11:
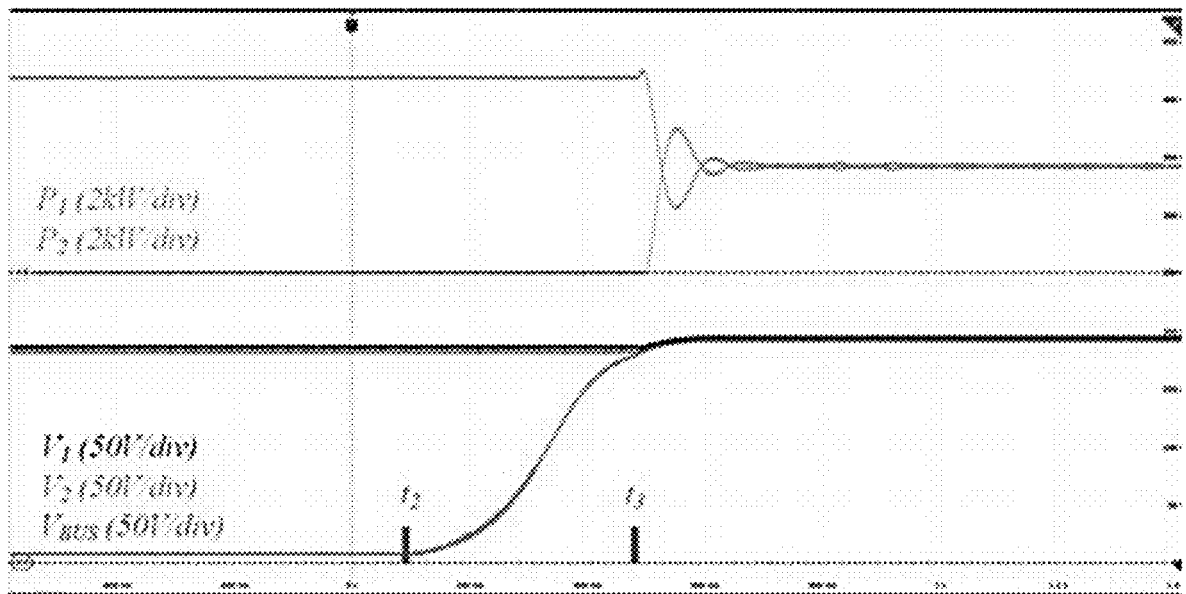

FIG. 11 shows the start-up and connection process of converter 2. Converter 2 is enabled at $t_2$, and it is started from a very small voltage. At $t_3$, the voltage buildup is finished, and the converter is connected to the DC bus. In steady state, the resistive load is powered the by converter 1 and 2 together. The power output of the converters is $P_1$=$P_2$=3.68 kW. The converter voltage is $V_1$=$V_2$=192.7 V. The load voltage is 190.8 V. Proportional power sharing and voltage synchronization is achieved, which validates the theoretical analysis.

Figure 12:
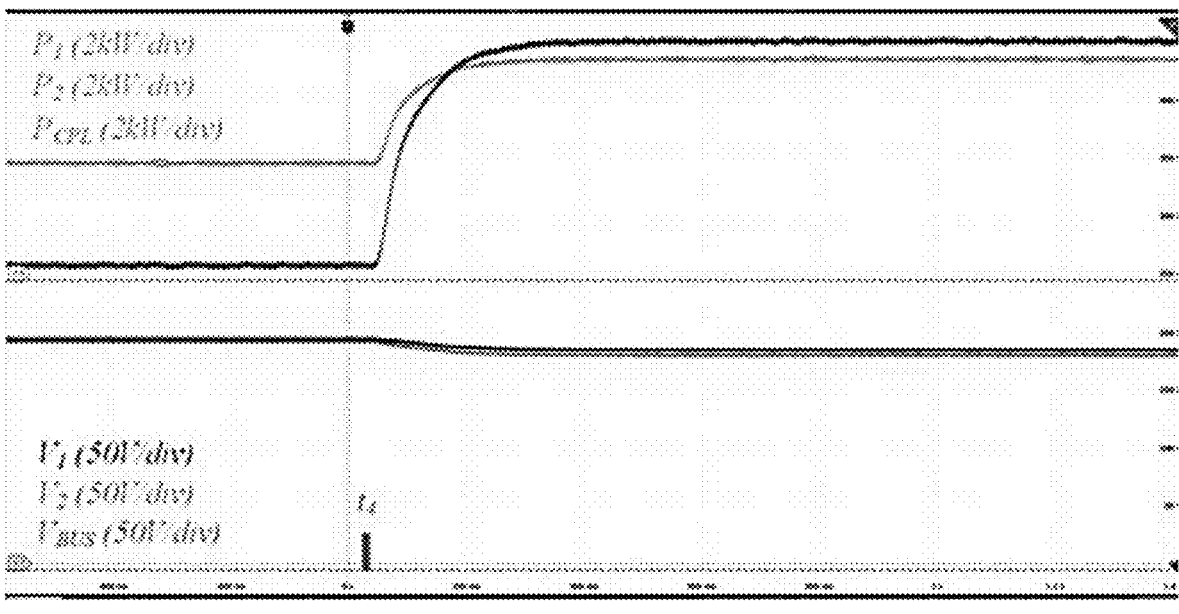

FIG. 12 shows system dynamics with the CPL. Shortly before $t_4$, the CPL is connected to the DC bus and its power is close to 0. At $t_4$, the CPL power steps to $P_{CPL}$=8 kW such that the total power consumption ($P_1$+$P_2$) in the microgrid is 14.7 kW. In steady state, the converters' voltages are synchronized to $V_1$=$V_2$=182.5 V. The load voltage is 178.5 V. The load power is shared equally between the two converters $P_1$=$P_2$=7.35 kW. This shows that DNDC can achieve stable operation, and proportional power sharing and voltage synchronization in the presence of CPL.

Voltage Regulation and Power Sharing under Mismatched Line Impedance. To consider a more general situation where the line impedances of the two converters are different, set $r_1$=0.1 $\Omega$ and $r_2$=0.3$\Omega$, and thus equation (20) is not satisfied. Both the CPL and resistive load are connected to the DC bus. By adjusting the power consumption of the CPL, the total power consumption in the microgrid is maintained at 13.9 kW to avoid any potential overloading due to unequal power sharing.

Figure 13A:
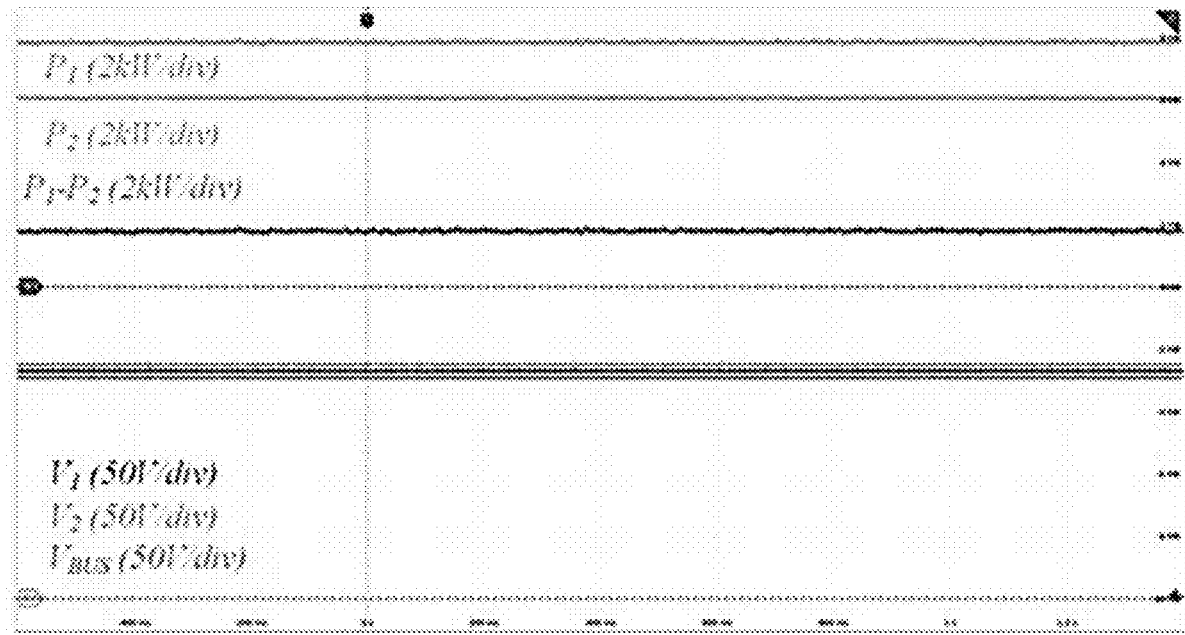

FIG. 13A shows the steady-state test results with DNDC. Due to the mismatched line impedance, the power is not equally shared between the two converters. With $P_1$=7.84 kW and $P_2$=6.06 kW, the power mismatch is $\Delta P_{DNDC}$=$P_1$-$P_2$=1.78 kW shown by the "$P_1$-$P_2$" line in FIG. 13A. The converter voltage is $V_1$=181.0 V and $V_2$=186.4 V. The DC bus voltage is $V_{bus}$=176.7 V.

Figure 13B:
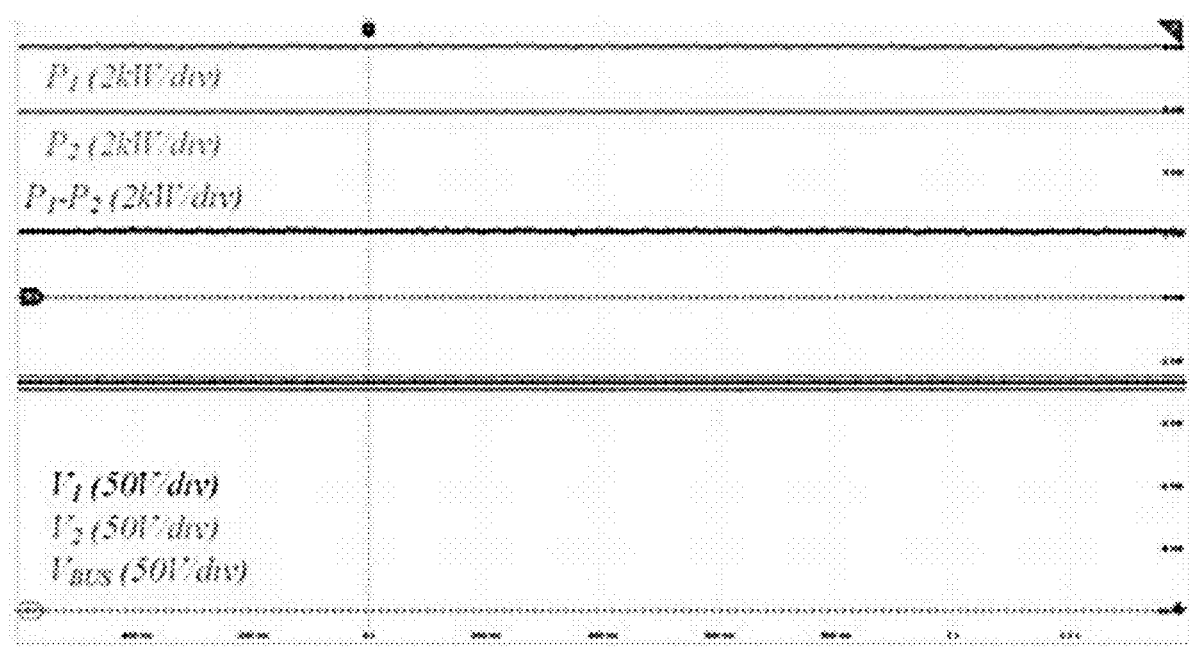

To show the advantages of DNDC over conventional linear droop, droop control for converters 1 and 2 was implemented, and the same test repeated with 13.9 kW total power consumption in the microgrid. The droop gains for the converters were designed to have 0.1 p.u. voltage deviation at full power, i.e., $K_{p,1}$=$K_{p,2}$=20V/8 kW. This gives the comparable design of linear droop and DNDC as shown in FIG. 6. The steady-state test results with droop control are shown in FIG. 13B.

Under droop control, the converter power output is $P_1$=8.0 kW and $P_2$=5.90 kW. The power mismatch is $\Delta P_{droop}$=$P_1$-$P_2$=2.10 kW, which is larger than $\Delta P_{DNDC}$. This validates the analysis, i.e., DNDC has better power sharing than droop control under heavy load condition. This advantage is important when the converters are close to overloading at heavy load condition. For example, for droop control, converter 1 would be overloaded with a slightly increase in load while for DNDC, there is about 160 W margin from converter 1 being overloading. Under droop control. The converter voltage is $V_1$=180.4 V and $V_2$=185.6 V; the DC bus voltage is $V_{bus}$=176.0 V, which is 0.7 V lower than that with DNDC.

Figure 14:
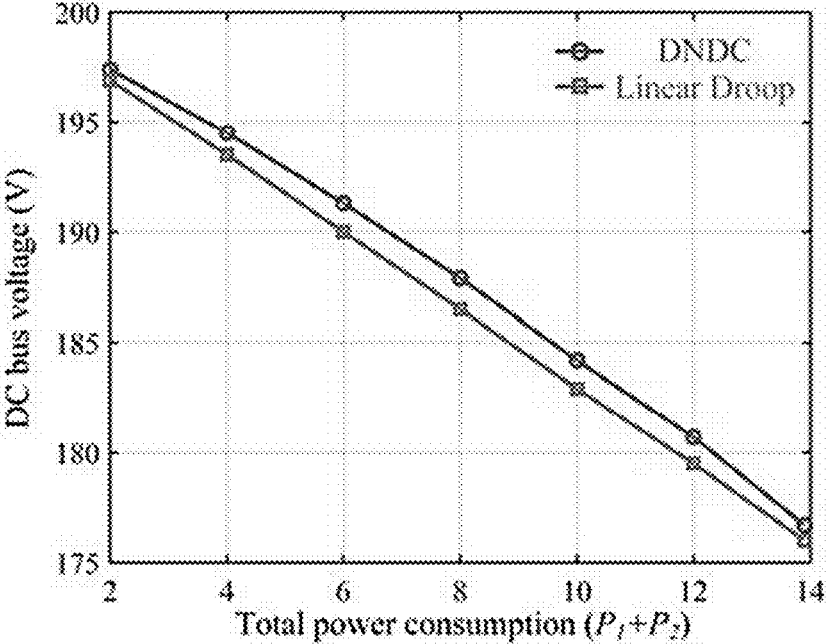

To further show that DNDC has tighter voltage regulation than droop control over all load conditions, the DC bus voltage was recorded under different total power consumption by changing the power of the CPL. The power of the CPL was allowed to be negative such that the total power consumption can be lower than the resistive load power. The results are shown in FIG. 14. For all the testing points, the DC bus voltage with DNDC is higher than that with droop control.

Virtual Inertia of DNDC. In this test, the two buck converters are connected to the DC bus through equal line impedance, i.e., $r_1$=$r_2$=0.1$\Omega$. To verify the virtual inertia provided by DNDC, the DNDC parameters, shown in Table I of FIG. 9A, were changed to $\mu$=0.0764 and $\eta$=0.154$\mu$ such that the virtual inertia is significant. In additional, the CPL was replaced with another 5 $\Omega$ resistive load to eliminate any inertia effect introduced by the CPL (i.e., resistive load can step instantly, while the CPL contains its own control dynamics). Together with the existing 5 $\Omega$ (resistive load, the total load is 16 kW at the nominal voltage.

Figure 15A:
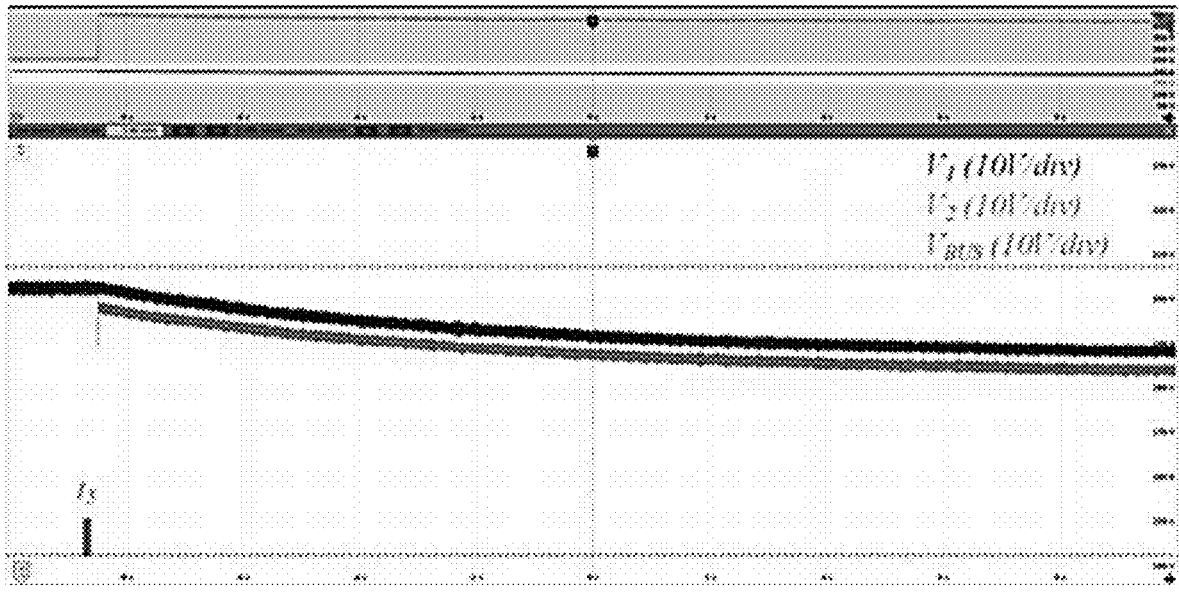
Figure 15B:
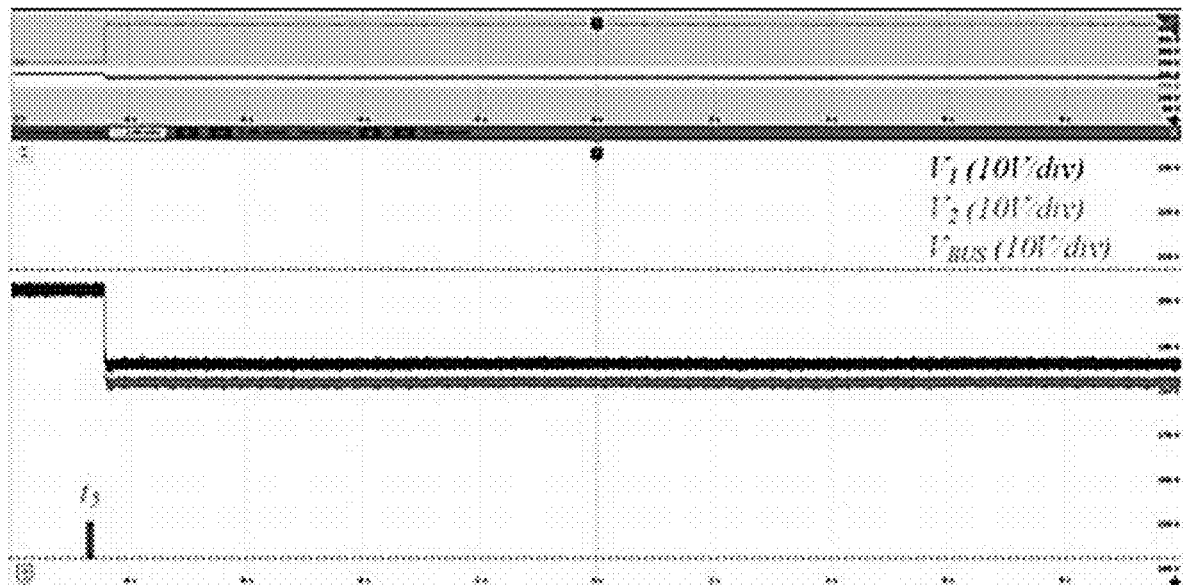

FIGS. 15A and 15B show the test results when the converters are controlled by DNDC and droop control, respectively. Before $t_5$, the two converters are operating without any load on the DC bus, which gives the nominal voltage at all locations, $V_1$=$V_2$=$V_{bus}$=200 V. At $t_5$, the two 5 $\Omega$ resistive loads are connected to the DC bus.

For droop control in FIG. 15B, the voltages step down to their new steady-state values instantaneously, yielding little inertia effect. For DNDC in FIG. 15A, after the load step, the voltages approach their new steady state value gradually, demonstrating its virtual inertia effect. Note that at $t_5$ there is a very fast transient that lasts several milliseconds due to the load step. This transient can be reduced by adding capacitors on the DC bus. In the test, there is no capacitor on the DC bus to isolate the effect of the virtual inertia of DNDC. Further, this fast transient will not be visible to other devices on the DC bus due to their input filters. The average ROCOV during ($t_5$, $t_5$+2 s) is 2 V/s under the selected virtual inertia. It is worth noting that the virtual inertia of DNDC can be dynamically adjusted during operation by changing its parameters.

Figure 16:
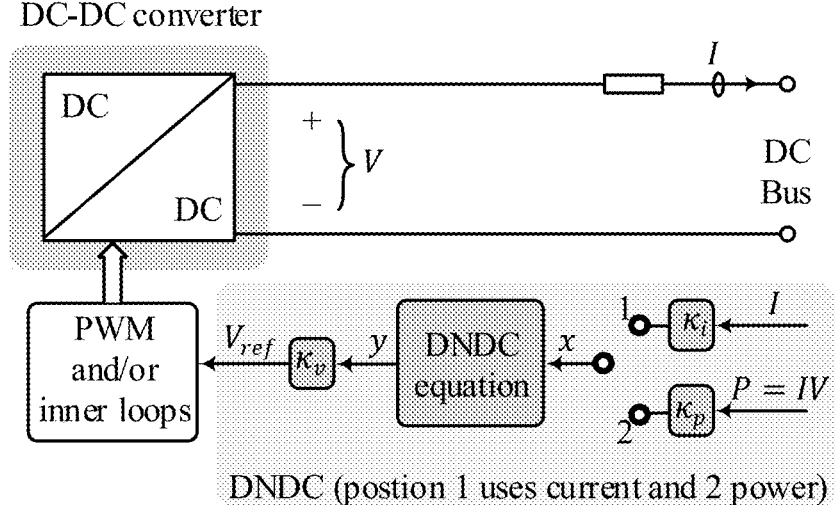
FIG. 16 illustrates an example of a generalized DNDC, in accordance with various embodiments of the present disclosure.

Referring next to FIG. 16, shown is an example of a generalized DNDC implementation. The measured output current (power) is scaled by $\kappa_i$ ($\kappa_p$) and sent to the DNDC equation, the output of which is further scaled by $\kappa_v$ to serve as the voltage reference of the DC-DC converter. The generalized DNDC can be based on the following dynamic equation:

$$\dot{y} = \mu y^M \left(1 - y^N\right) - \mu \eta x^K, \qquad (38)$$

where x is the input and y is the output of the system, $\mu$ and $\eta$ are the DNDC parameters, and $M{\geq}1$, $N{\geq}1$ and $K{\geq}1$. For inputs of current (I) and power (P), the dynamic equation can be written as:

$$\dot{V} = \mu V^M\left(1 - V^N\right) - \mu\eta I^K \text{ if using current measurment, and}$$

$$\dot{V} = \mu V^M\left(1 - V^N\right) - \mu\eta P^K \text{ if using power measurment.}$$

The dynamic equation using M=1, N=2, and K=1, which for a voltage output (x=V) and current input (y=I) gives:

$$\dot{V} = \mu V^M\left(1 - V^2\right) - \mu\eta I.$$

As a subcase where an analytical expression is desired for design, consider M=N. The dynamic equations can be written as:

$$\dot{V} = \mu V^M\left(1 - V^N\right) - \mu\eta I^K \text{ if using current measurment, and}$$

$$\dot{V} = \mu V^M\left(1 - V^N\right) - \mu\eta P^K \text{ if using power measurment.}$$

The steady-state voltage can then be solved as:

$$V = \sqrt[N]{\frac{1}{2} + \sqrt{\frac{1}{4} - \eta I^K}} \text{ or } V = \sqrt[N]{\frac{1}{2} + \sqrt{\frac{1}{4} - \eta P^K}}.$$

In a first set of examples, fix K=1 with a power measurement, which gives:

$$V = \sqrt[N]{\frac{1}{2} + \sqrt{\frac{1}{4} - \eta P}}.$$

Figure 17A:
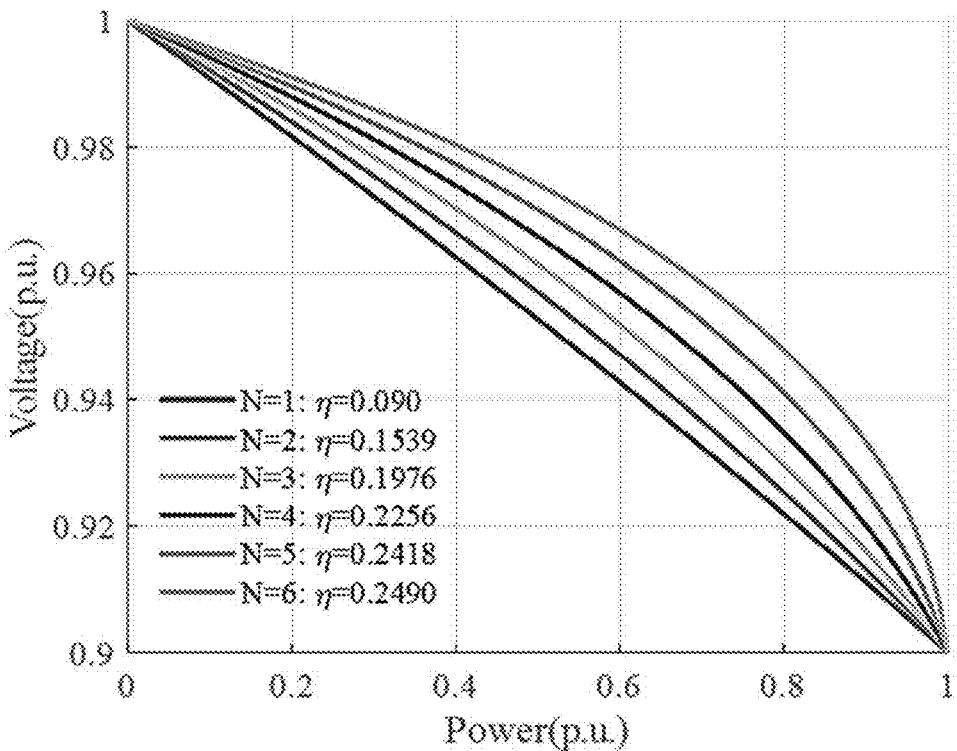
FIGS. 17A and 17B illustrate examples of droop curves of the generalized DNDC, in accordance with various embodiments of the present disclosure.

The curves of FIG. 17A illustrate the effect on the voltage droops of different values of N. The parameter $\eta$ depends on N, which were all designed to have V=0.9 p.u. at P=1 p.u. N=2 gives the relationship previously described.

In a second set of examples, fix N=2 with a power measurement, which gives:

$$V = \sqrt[N]{\frac{1}{2} + \sqrt{\frac{1}{4} - \eta P^K}}.$$

Figure 17B:
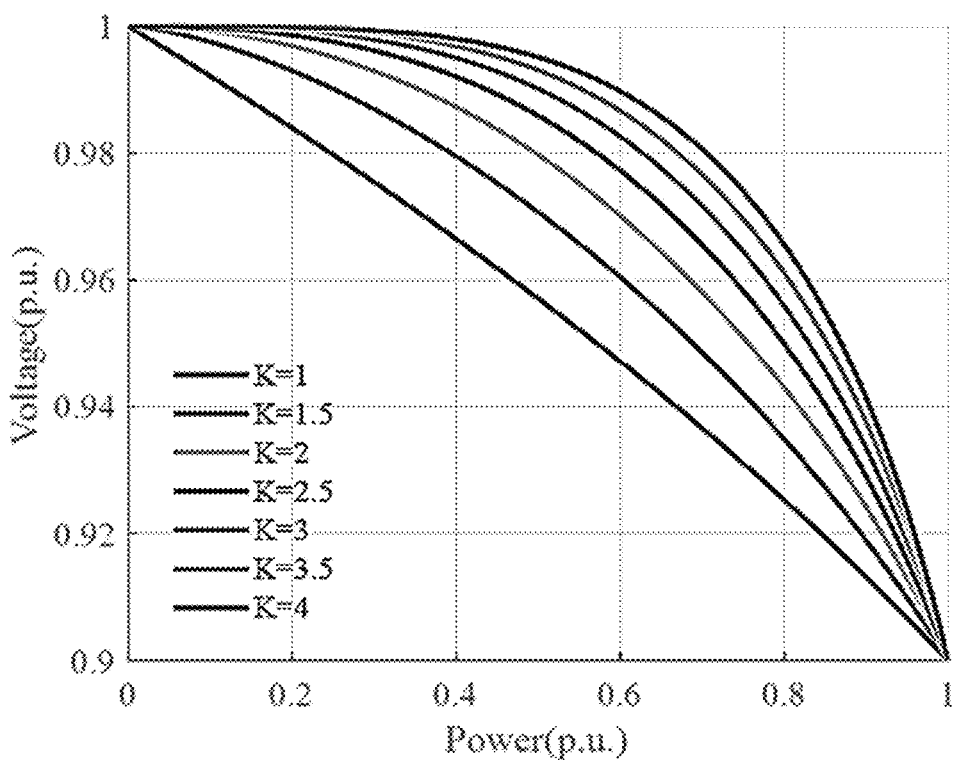

The curves of FIG. 17B illustrate the effect on the voltage droops of different values of K. The parameter $\eta{=}0.154$ for all curves since it depends on N. K=1 is the form previously described.

Figure 18:
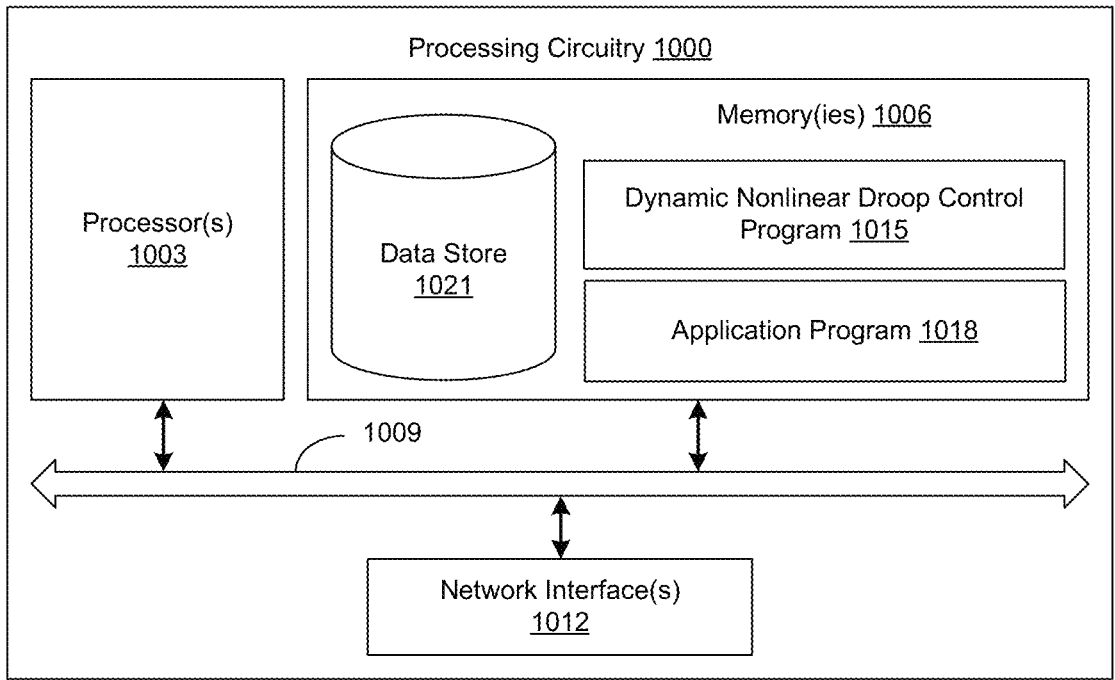
FIG. 18 a schematic diagram illustrating an example of processing circuitry that can be used to implement the DNDC, in accordance with various embodiments of the present disclosure.

Referring next to FIG. 18, shown is a schematic diagram illustrating an example of a processing circuitry 1000 that can be used for dynamic nonlinear droop control, in accordance with various embodiments of the present disclosure. The processing circuitry 1000 can include at least one processor circuit having, for example, a processor 1003 and a memory 1006, both of which are coupled to a local interface 1009. The local interface 1009 may comprise, for example, a data bus with an accompanying address/control bus or other bus structure as can be appreciated. The processing circuitry 1000 can comprise one or more computing/processing device such as, e.g., a smartphone, tablet, computer, controller, etc. To this end, each processing circuitry 1000 may comprise, for example, at least one server computer or like device, which can be utilized in a cloud-based environment.

In some embodiments, the processing circuitry 1000 can include one or more network interfaces 1012. The network interface 1012 may comprise, for example, a wireless transmitter, a wireless transceiver, and/or a wireless receiver. The network interface 1012 can communicate to a remote computing/processing device or other components using a Bluetooth, WiFi, or other appropriate wireless protocol. As one skilled in the art can appreciate, other wireless protocols may be used in the various embodiments of the present disclosure. The network interface 1012 can also be configured for communications through wired connections.

Stored in the memory 1006 are both data and several components that are executable by the processor(s) 1003. In particular, stored in the memory 1006 and executable by the processor 1003 can be a dynamic nonlinear droop control application 1015 which can control power converter operation as disclosed herein, and potentially other applications 1018. In this respect, the term "executable" means a program file that is in a form that can ultimately be run by the processor(s) 1003. Also stored in the memory 1006 may be a data store 1021 and other data. In addition, an operating system may be stored in the memory 1006 and executable by the processor(s) 1003. It is understood that there may be other applications that are stored in the memory 1006 and are executable by the processor(s) 1003 as can be appreciated.

Examples of executable programs may be, for example, a compiled program that can be translated into machine code in a format that can be loaded into a random access portion of the memory 1006 and run by the processor(s) 1003, source code that may be expressed in proper format such as object code that is capable of being loaded into a random access portion of the memory 1006 and executed by the processor(s) 1003, or source code that may be interpreted by another executable program to generate instructions in a random access portion of the memory 1006 to be executed by the processor(s) 1003, etc. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores, and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, ultrasound or other devices. The processor 1003 may be of electrical or of some other available construction.

Although the dynamic nonlinear droop control application 1015, and other various applications 1018 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the laser ablation control application 1015, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the dynamic nonlinear droop control application 1015, may be implemented and structured in a variety of ways. For example, one or more applications described may be implemented as modules or components of a single application. For example, the dynamic nonlinear droop control application 1015 can include a wide range of modules such as, e.g., an initial model or other modules that can provide specific functionality for the disclosed methodology. Further, one or more applications described herein may be executed in shared or separate computing/processing devices or a combination thereof. For example, a plurality of the applications described herein may execute in the same processing circuitry 1000, or in multiple computing/processing devices in the same computing environment. To this end, each processing circuitry 1000 may comprise, for example, at least one server computer or like device, which can be utilized in a cloud-based environment.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for dynamic nonlinear droop control (DNDC) for direct current (DC) power conversion, comprising:

receiving an indication of an output of a DC power converter, the indication being a scaled measurement of output current or output power of the DC power converter;

generating a control signal based upon the indication, wherein the control signal is based at least in part upon:

$$\dot{y} = \mu y^M \left(1 - y^N\right) - \mu\eta x^K,$$

where x is the indication, y is power converter voltage, $\mu$ and $\eta$ are DNDC parameters, and $M \geq 1$, $N \geq 1$ and $K \geq 1$; and adjusting operation of the DC power converter in response to the generated control signal.

2. The method of claim 1, wherein M, N, and K are integer values.

3. The method of claim 1, wherein M, N, and K are fractional values.

4. The method of claim 1, wherein the DC power converter is a DC-DC power converter.

5. The method of claim 1, wherein pulse width modulation switching of the DC power converter is controlled based upon the scaled generated control signal.

6. A dynamic nonlinear droop control (DNDC) for direct current (DC) power conversion, comprising:

an input configured to receive an indication of an output of a DC power converter, the indication being a scaled measurement of output current or output power of the DC power converter;

processing circuitry configured to generate a control signal based upon the indication, wherein the control signal is based at least in part upon:

$$\dot{y} = \mu y^M \left(1 - y^N\right) - \mu\eta x^K,$$

where x is the indication, y is power converter voltage, $\mu$ and $\eta$ are DNDC parameters, and $M \geq 1$, $N \geq 1$ and $K \geq 1$; and a controller configured to adjust operation of the DC power converter in response to the generated control signal.

7. The DNDC of claim 6, wherein M, N, and K are integer values.

8. The DNDC of claim 6, wherein M, N, and K are fractional values.

9. The DNDC of claim 6, wherein the DC power converter is a DC-DC power converter.

10. The DNDC of claim 6, wherein pulse width modulation switching of the DC power converter is controlled based upon a scaled generated control signal.

11. The DNDC of claim 6, wherein the DC power converter comprises the DNDC.

12. A DC power grid, comprising:

a plurality of DC power converters, each of the plurality of DC power converters including a dynamic nonlinear droop control (DNDC) comprising circuitry configured to:

receive an indication of an output of that DC power converter, the indication being a scaled measurement of output current or output power of that DC power converter;

generate a control signal based upon the indication, wherein the control signal is based at least in part upon:

$$\dot{y} = \mu y^M \left(1 - y^N\right) - \mu\eta x^K,$$

where x is the indication, y is power converter voltage, $\mu$ and $\eta$ are DNDC parameters, and $M \geq 1$, $N \geq 1$ and $K \geq 1$; and adjust operation of that DC power converter in response to the generated control signal.

13. The DC power grid of claim 12, wherein the operation of the DC power converter is adjusted via pulse width modulation switching of the DC power converter.

14. The DC power grid of claim 13, wherein the pulse width modulation switching of the DC power converter is controlled based upon a scaled generated control signal.

15. The DC power grid of claim 12, wherein M, N, and K are integer values.

16. The DC power grid of claim 12, wherein M, N, and K are fractional values.

* * * * *